E. P. BULLARD, Jr.
MULTIPLE SPINDLE MACHINE TOOL.
APPLICATION FILED OCT. 25, 1917.

1,360,175.

Patented Nov. 23, 1920.
11 SHEETS—SHEET 6.

Witnesses
Elbert T. Hull
Lillian M. Alling

Inventor
Edward P. Bullard, Jr.
By
Chamberlain & Newman
Attorneys

E. P. BULLARD, Jr.
MULTIPLE SPINDLE MACHINE TOOL.
APPLICATION FILED OCT. 25, 1917.

1,360,175.

Patented Nov. 23, 1920.
11 SHEETS—SHEET 7.

Witnesses

Inventor
Edward P. Bullard, Jr.
By
Chamberlain & Newman
Attorneys

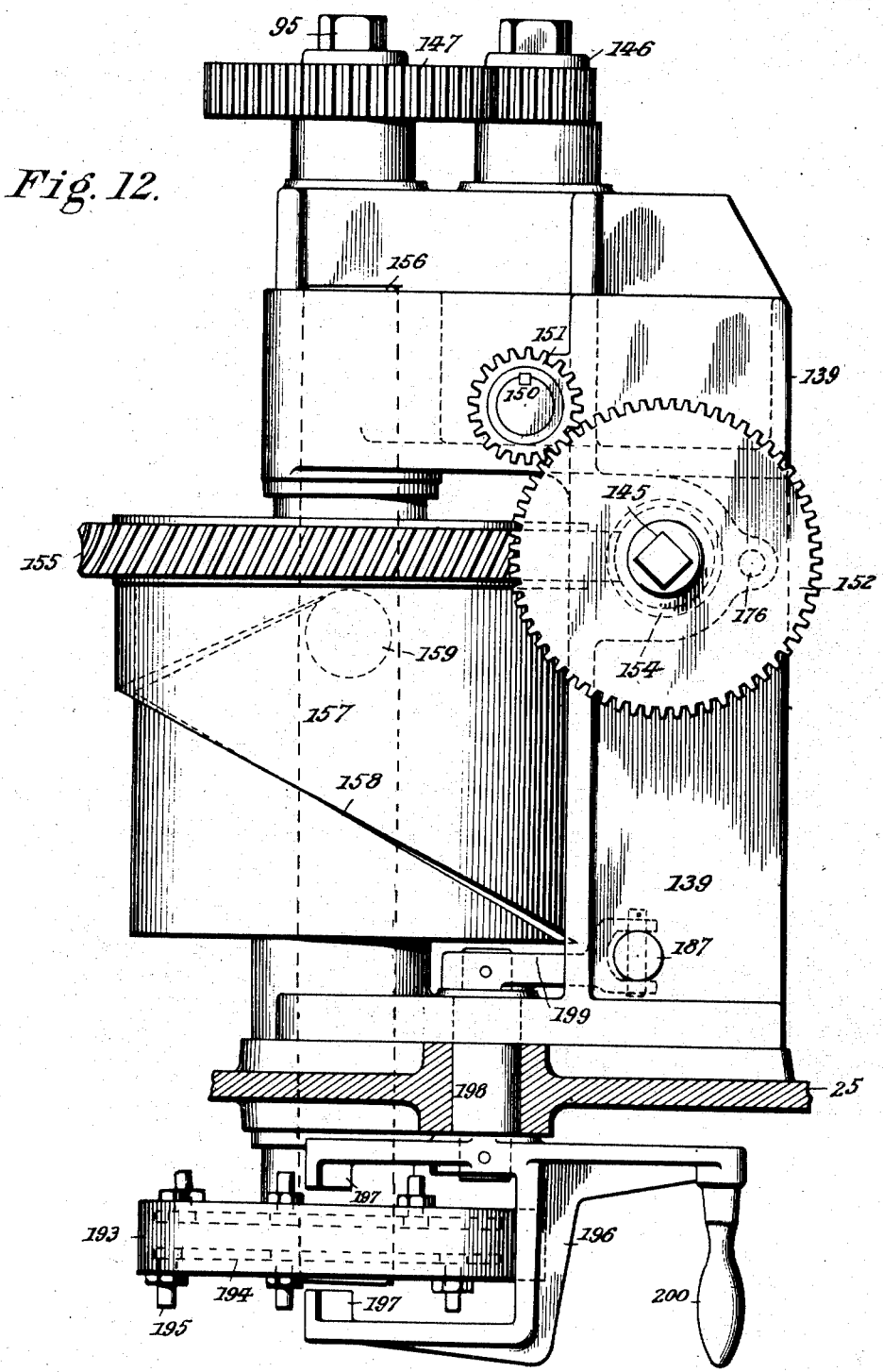

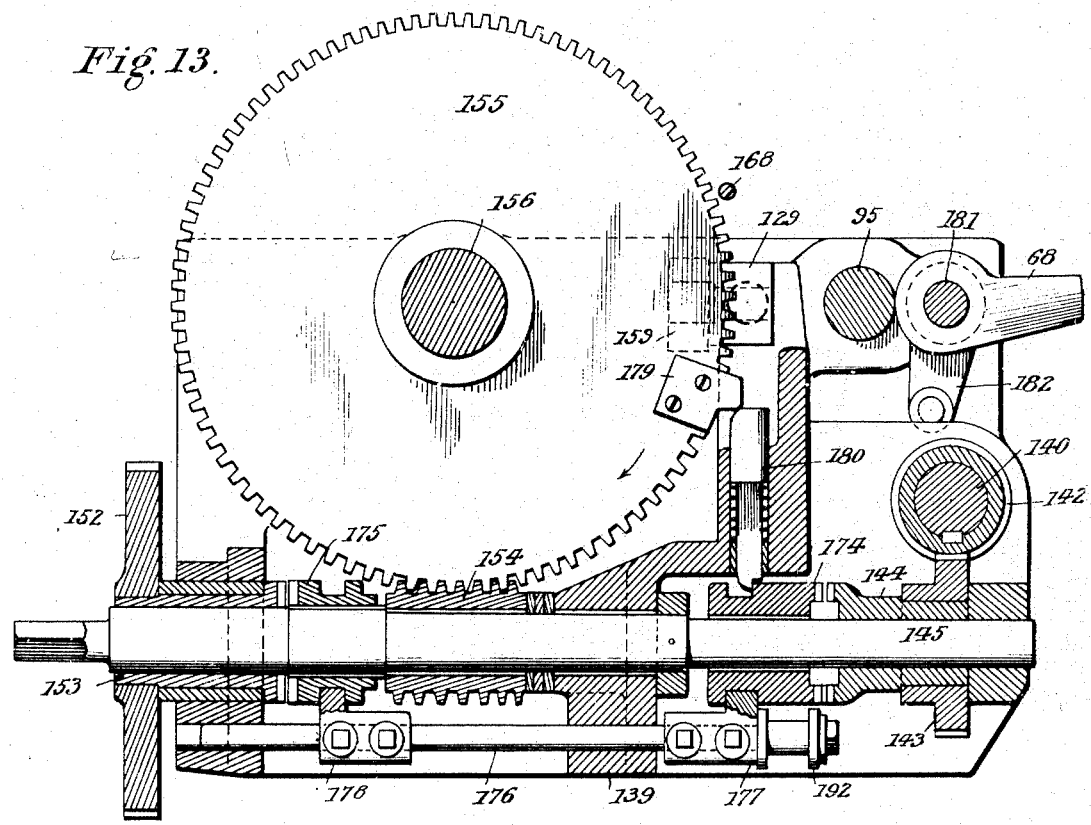
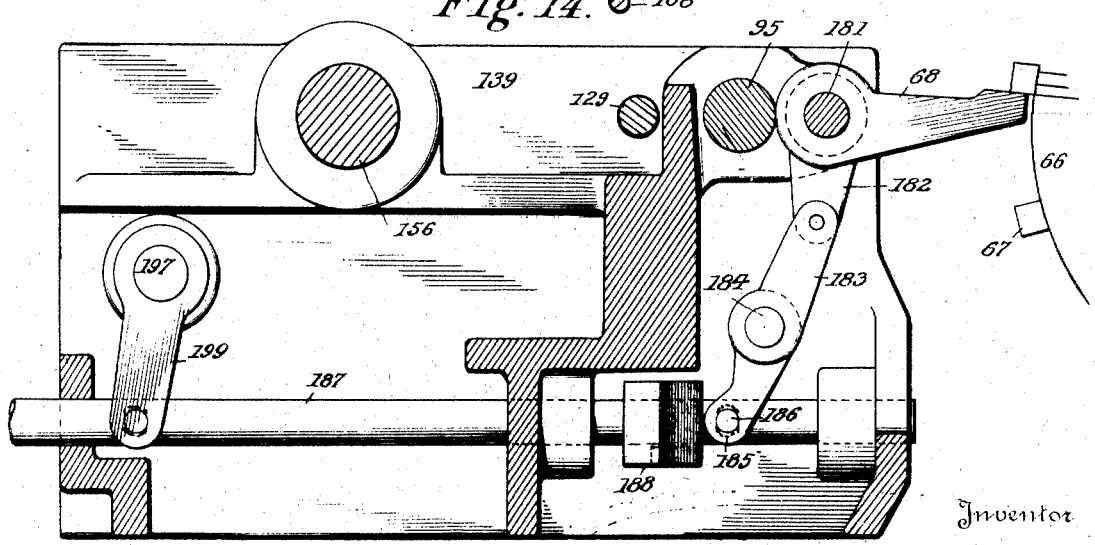

UNITED STATES PATENT OFFICE.

EDWARD P. BULLARD, JR., OF STRATFORD, CONNECTICUT, ASSIGNOR TO THE BULLARD MACHINE TOOL CO., OF BRIDGEPORT, CONNECTICUT, A CORPORATION OF CONNECTICUT.

MULTIPLE-SPINDLE MACHINE-TOOL.

1,360,175. Specification of Letters Patent. Patented Nov. 23, 1920.

Application filed October 25, 1917. Serial No. 198,404.

*To all whom it may concern:*

Be it known that I, EDWARD P. BULLARD, Jr., citizen of the United States, and resident of Stratford, in the county of Fairfield and State of Connecticut, have invented certain new and useful Improvements in Multiple-Spindle Machine-Tools, of which the following is a specification.

My invention refers to new and useful improvements in automatic multiple spindle machine tools of the type commercially known as the Bullard Mult-au-matic, for boring, threading, and turning operations all of which may be done automatically in various ways upon numerous kinds and shapes of metal parts.

The machine in general is styled after and is an improvement upon my former multiple spindle machine for which Letters-Patent of the United States, No. 1,258,089, were granted March 5th, 1918.

The purpose of this invention is to produce a machine which will be simple in construction, having a less number of parts, and lighter in weight than the before-mentioned machine and will be particularly well adapted for doing small parts, of which there is a large field of various kinds and shapes.

The machine is automatic in its operation and requires but one attendant to load and unload the work to and from the work-carrying spindles of which there are preferably six. The loading and unloading is all done from the front, as shown in Figure 1, and is accomplished during each series of cutting operations upon the several pieces, as will later be more fully explained.

The machine includes a series of six work-carrying tables, all of which are mounted upon a common carrier that alternately and automatically rotates around a fixed center in a manner to carry the tables and work from one operating tool to another, said tools being mounted in vertically movable slides operatively connected to the column of the machine. There are five of these tool-carrying slides, which means one for each work table that is in operation. A separate set of feed works is provided for each tool-carrying slide and each serves to automatically move its slide, situated beneath, up and down to and from its work carrying table for each operation. In practice these tool-carrying slides all move down simultaneously in the performance of their respective operations and are tripped off and automatically returned to their upper and normal position as their respective operations are completed. The several sets of feed works are driven from a common gear and are controlled in said operations by a feed works controller as will later be more fully explained.

The machine is therefore designed to perform a number of operations upon each of the several pieces of work carried by the several work-carrying tables, the said work being performed upon each table at the same time, so that the only time lost, from a production standpoint, is that required for indexing the carrier and moving the work tables from one cutting tool to another. The work is placed upon the work tables when positioned at what is termed the loading station, which is that shown in front in Fig. 1 and at the right in Fig. 2. The work-carrying tables when in this position assume a position of rest while the other five spindles are being driven, and the time thus consumed for the operation of the work upon the other five spindles is employed in this particular by removing the completed work and placing another piece thereon to be operated upon. The carrier is then automatically rotated one-sixth of a turn, bringing the table which has just been loaded to the left for the initial operation. The work is finished at the station positioned to the right in Fig. 1, and is then brought forward to the loading station where it ceases to turn and remains idle during the removal and replacement of the work. The work carrying tables as designed only rotate when positioned beneath their respective tool-carrying slides, and while in such positions may be operated at any desired and fixed rate of speed, said speeds being determined by the change gears connected with the feed works as will later be more fully explained. Thus, if a number of pieces of work are to be performed each requiring five operations, and some of which operations would perhaps necessitate more time than another or a faster rotation than another, it could readily be provided for by setting the machine to drive the different spindles at the particular speed required and so that one operation on the piece of work would be performed at each station.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which:—

Fig. 12 shows a side view of the same feed works but as viewed from the left of Fig. 10.

Fig. 13 is a sectional plan view of the feed works taken on line 13—13 of Fig. 10, and Fig. 14 is a further sectional plan view of the same feed works taken on line 14—14 of Fig. 10.

Figure 1:
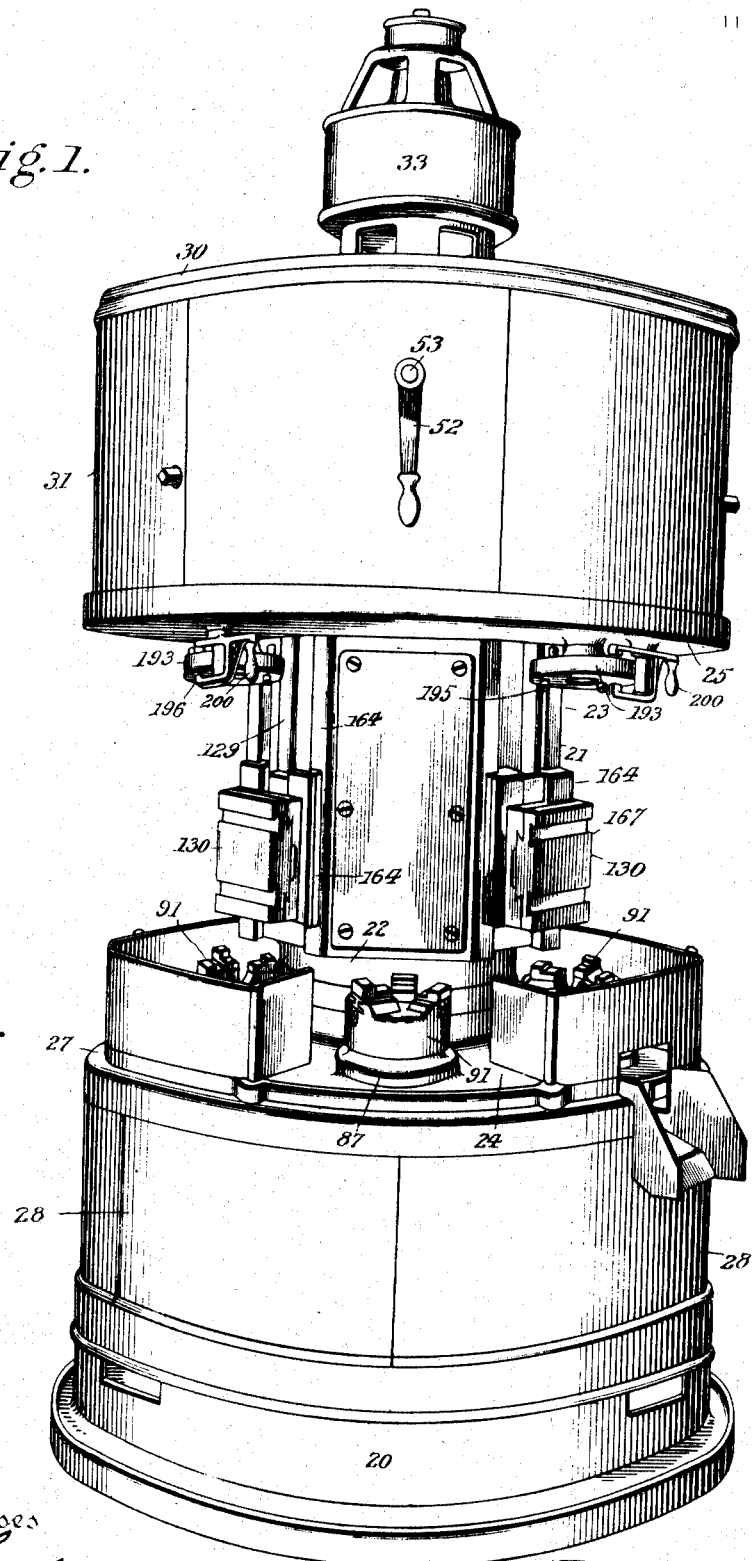
Fig. 1 shows a front perspective view of my improved form of multiple spindle machine complete.

The frame of the machine is made up of several parts, the bottom or base member being designated as 20 and is of a pan-like formation having suitable strengthening ribs, flanges and compartments. Upon the central portion of this base is mounted a column 21, the lower portion 22 of which is substantially round, while the upper portion 23 is of a hexagonal shape. This column, in part, serves as a central bearing around which the carrier 24, that supports the work tables, is rotated and further provides suitable guiding surfaces upon which the several tool-carrying slides are mounted, and finally as a means for supporting the feed works base 25. A series of posts 26 are secured to the base 20 and serve to support an annular housing 27 that encircles the carrier 24 mounted upon the round or cylindrical portion 22 of the column. A series of removable plates 28 are fitted between the lower edge portion of the housing and the upper edge portion of the base in a way to inclose the under part of the carrier and the mechanism for operating the same, which is not otherwise inclosed by the column. The several sets of feed works are secured upon the base plate 25, and the frame for each feed works includes a standard 29 upon which the top plate 30 is secured. The under edge portion of this top plate and the top edge portion of the base 25 are each provided with an annular groove which aline with each other and serve to receive and guide the plates 31 which serve to inclose the feed works and other mechanism contained within the upper part of the machine. In practice there are several of these plates and some of them are made to slide so that access may be had to the mechanism contained within this upper inclosure should occasion require.

The machine is designed to be operated from a single shaft which is preferably located central, in the top of the machine, and designated in the drawings as 32, and in this particular illustration constitutes the spindle of a vertical type of electric motor 33 mounted upon the top of the machine. It will be obvious, however, that any suitable form of belt drive can be substituted for the motor if desired.

Upon this shaft is secured a pinion 34 which meshes with and drives a gear 35 upon the lower member of the driving shaft 36 mounted in bearings 37 of a bracket 38, which, like the feed works bracket, is secured to the feed works base 25. Upon the lower end of this driving shaft 36 is secured a pinion 39 that meshes with and drives an idle gear 40 rotatably mounted upon an extension of the lower bearing 37 forming a part of the bracket 38. This idler in turn meshes with and drives a gear 41 upon a shaft 42 one end of which is journaled in a bearing 43 formed upon the inside of the column 21 and the other end portion in the flange 44 of the upper end 23 of the column. Upon the lower end of this shaft 42 is also mounted a pinion 45 that meshes with and drives a gear 46 upon a short shaft 47 that is journaled in a bearing formed on the inside of the column. Upon the upper end portion of the shaft 47 is mounted a pinion 48 that meshes with a gear 49 having an upper clutch face 50 and loosely journaled upon a central shaft 51. So much of the mechanism already described back to and including the driving shaft 36 are continuously driven, that is, when the machine is connected with power, and it is from and through this line of driven mechanism that the several parts of the machine are operated, as will later be more fully explained.

The machine as designed, in a way, constitutes two units, or two series of mechanisms, one of which is contained within the upper part of the machine and designed to operate the tool-carrying slides, as well as the work-carrying tables, while the other unit is located within the lower part of the machine and constitutes the mechanism for indexing and locking the carrier. The operation of the mechanism contained within the lower unit is in a measure controlled through the connections with and the mechanism comprising the upper unit and that in turn is controlled or started and stopped through the manipulation of a single hand lever designated as 52 and shown in Figs. 1 and 2.

The hand lever 52 is mounted upon a rocker shaft 53 journaled in the before-mentioned bracket 38 and carries a fork 54 to engage a sleeve 55 splined to the driven shaft 36. This sleeve 55 is connected by toggle links 56 with one member 57 of a friction clutch that is also splined to the shaft 36 and like the said sleeve is designed to turn therewith. The other member 58 of the clutch is loosely mounted upon the same shaft 36 and has formed upon its periphery a gear 59 that meshes with and drives a larger and common gear 60 loose upon a tubular bearing 61 arranged central within the upper portion of the machine and secured to the feed works base. The several sets of feed works are simultaneously operated through this common gear 60 and as will be apparent said operation is controlled by the clutch 57 upon the shaft 36.

This clutch, aside from being adapted for hand operation, is also provided with connections for its automatic operation as is necessary for starting and stopping the slides and incidentally the starting and stopping of the work-carrying tables, both of which operations are necessary and take place between the indexing. This automatic connection in Figs. 2 and 3 includes an extension 62 that carries a roll 63 which normally lies in the path of the cams 64 and 65 mounted upon the controller 66 mounted upon the upper end of the shaft 57 that is journaled within the before-mentioned bearing 60 and driven through the clutch member 50. The cams 64 and 65 mounted upon the peripheral face of the controller 66 serve to positively move the arm 62 and its sleeve together with the connected clutch member 57 up and down to open and close the clutch, one of the said cams serving to engage and the other to disengage said clutch. This controller also includes a series of five lugs 67 which project out radially from the periphery thereof and each is in position to engage an arm 68 of a particular one of the feed works. The shaft 51 carrying this controller 66 is located central within the machine, and also supports the indexing controller 69 mounted lower down. Thus two controllers serve as a means for controlling the several operations of the machine, as will later be more fully explained. This lower controller affords a selective operating means for the several slides, so that any slide may be set, so long as it is the last slide to come up, to engage the clutch and start the carrier to index.

Upon the lower portion of the shaft 51 is mounted a gear 70 that meshes with and drives another gear 71 mounted upon a crank shaft 72 that is journaled in bearings 73 formed upon the inside of the column, said shaft carrying upon its lower end an indexing arm 74 having a straight guideway 75 formed in its upper face to engage and disengage the several spindle ends 76 to index the carrier 24. In practice this arm is given an oscillatory movement by reason of it being carried upon the stud end 77 of the rotatable crank shaft and slidably connected to the shoe 78 that is mounted in a bearing 79 turned on the column 22 directly below and in line with the shaft 51 so that with each operation of the arm a spindle end is engaged and, together with the carrier, is moved forward a distance sufficient to constitute one-sixth of a turn of the carrier, thus moving the work-tables from one operating station to another.

The carrier 24, as before suggested, in part includes an inner cylindrical wall having a vertically tapered inner face which operatively engages the outer tapered wall 22 of the column 21. This carrier is further provided upon its under face with a vertical thrust bearing 80 that rests upon a washer 81 mounted upon an adjustable nut 82 threadably attached to the extreme lower end portion of the column and adjacent to the flange 83 of the base and upon which the column is directly supported. By reason of the adjustability of the nut 82 the carrier may be adjusted vertically with relation to the tapered cylindrical portion of the column, for taking up the wear or possible side play of the carrier. The carrier further includes a top flange portion 84 and a bottom flange portion 85 which are further connected by radially disposed ribs 86. Said flange portions serve to support the rotatable spindle bearings 87 and 88 of which there are six pair arranged at an equal distance apart, and at an equal distance from the center or axis of the carrier. The upper spindle bearing 87 is made attachable to the carrier by means of screws 89 and the lower spindle bearing is secured in a similar manner by screws 90.

Figure 6:
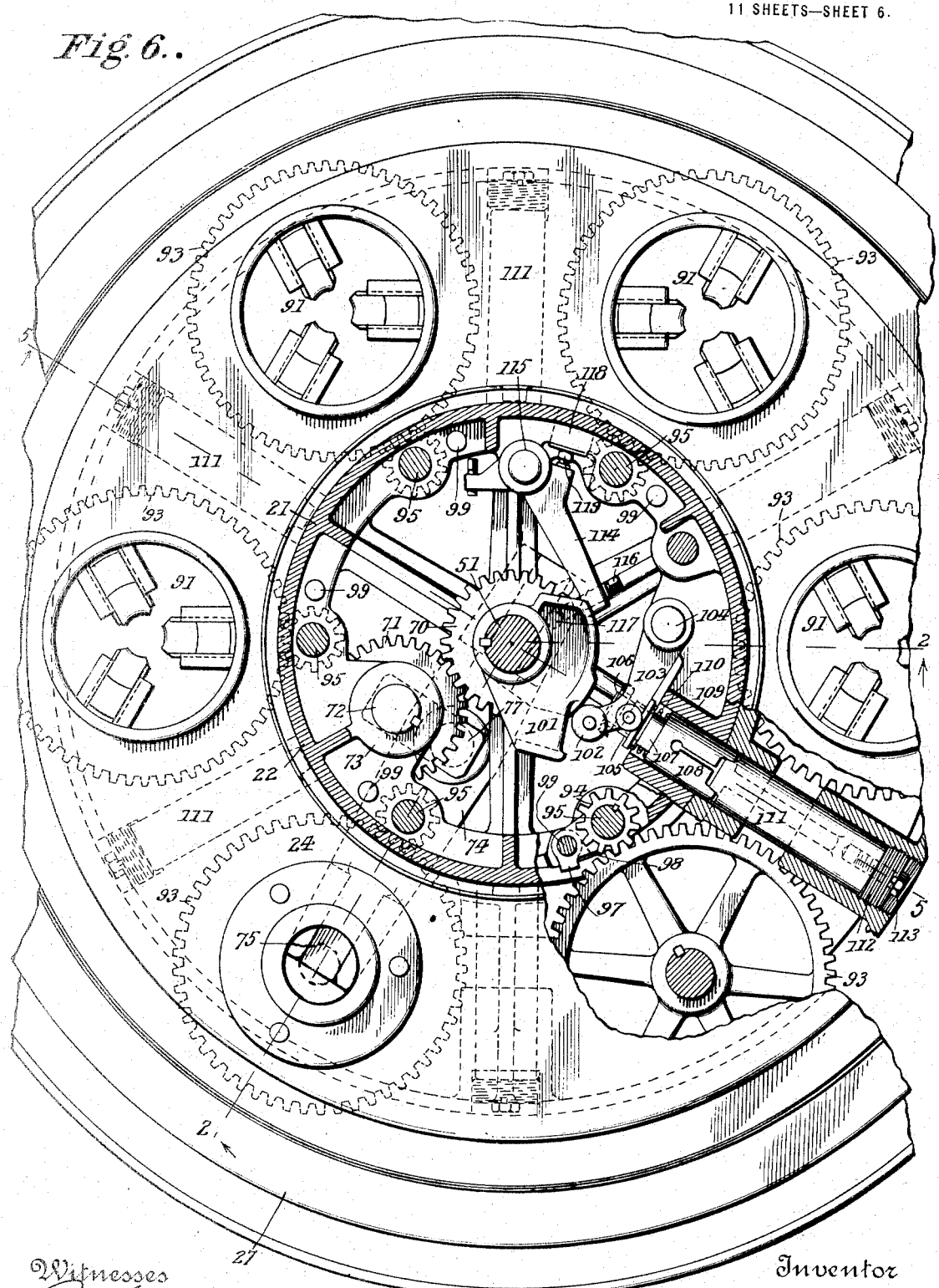
Fig. 6 is a sectional plan view, partially broken away, of the base of the machine, and upon substantially the same scale as that of Fig. 5.
Figure 7:
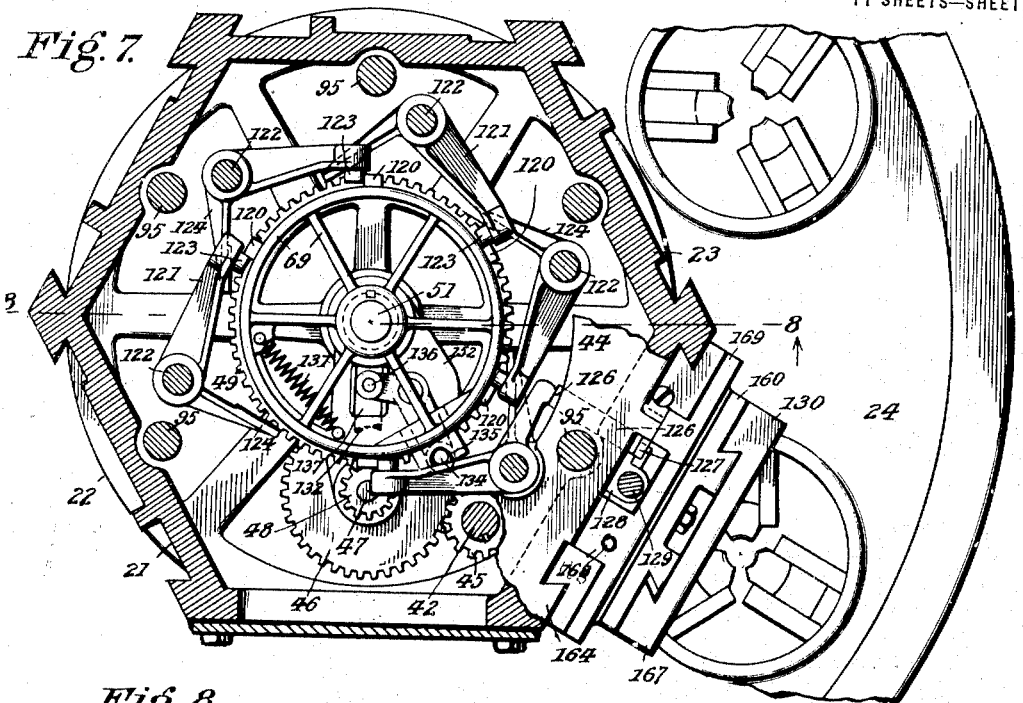
Fig. 7 is a sectional plan view taken across the central portion or column of the machine as indicated on line 7—7 of Fig. 2.
Figure 8:
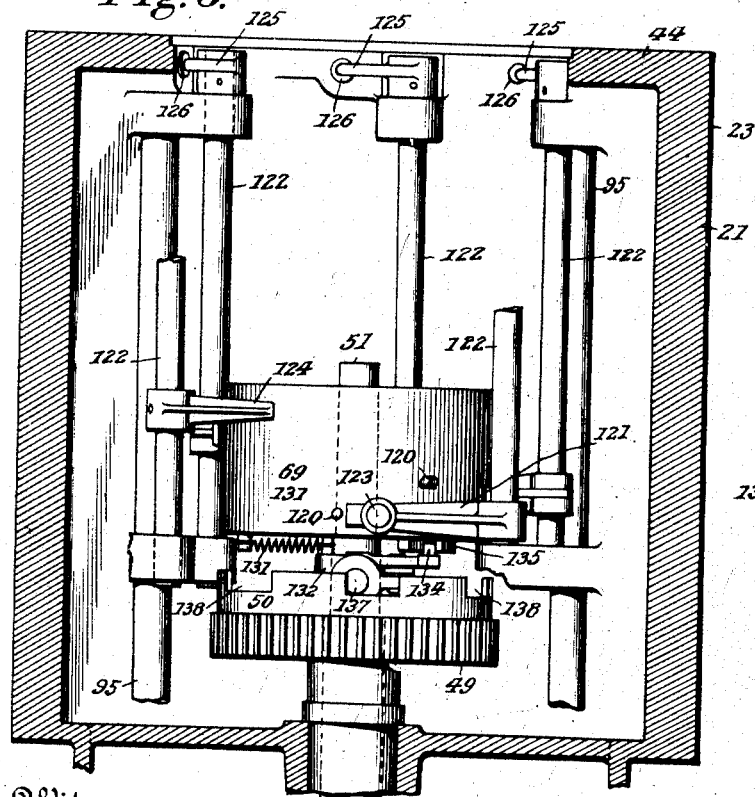
Fig. 8 is a central vertical sectional view taken through the column and mechanism shown in Fig. 7 and as indicated on line 8—8 of said figure.
Figure 9:
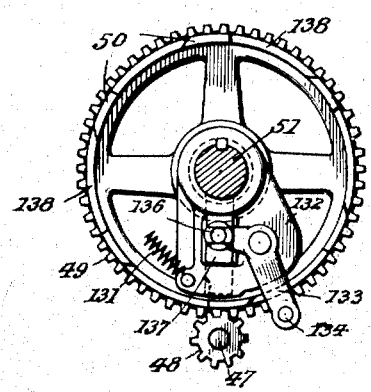
Fig. 9 is a detached plan view of the central gear shown in Fig. 7 and operatively connected parts.
Figure 10:
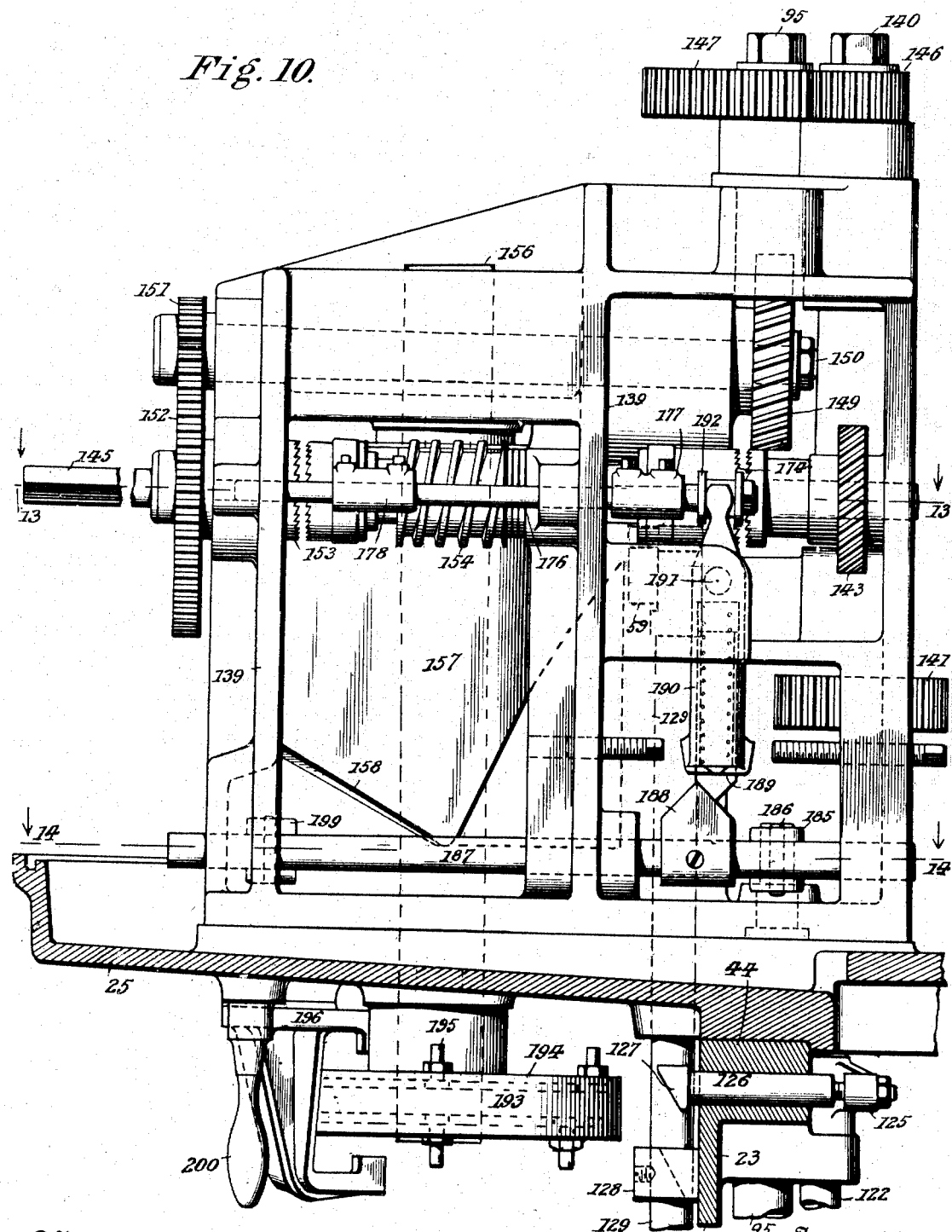
Fig. 10 shows upon an enlarged scale, a front side elevation of the feed works shown in Fig. 2.
Figure 11:
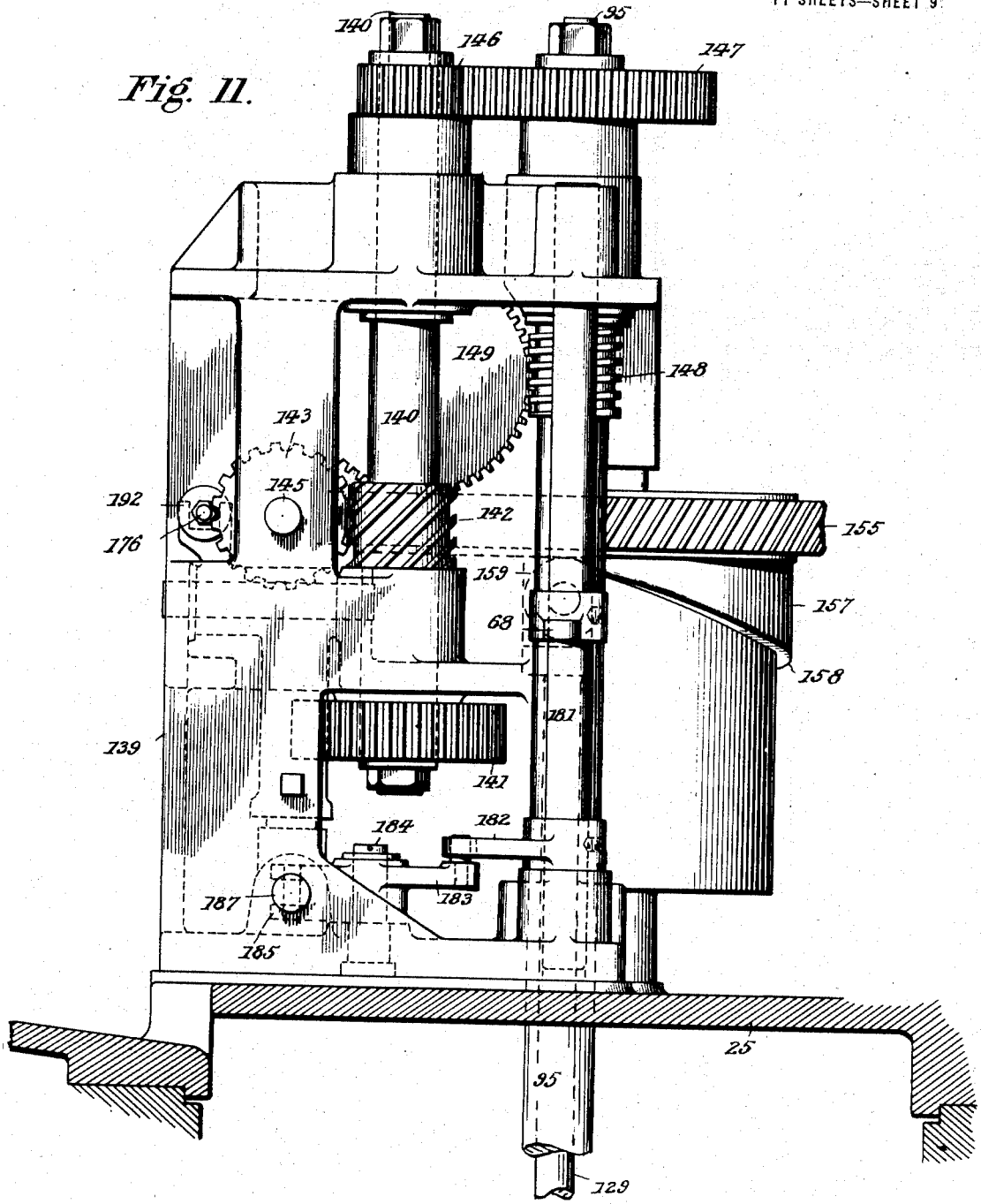
Fig. 11 is a further elevation of this same feed works as seen from the right side of Fig. 10.

The work-carrying tables 91, as well as their spindle bearings, are alike in construction and therefore the same reference numerals will be used to designate the same parts of each of the six work-carrying tables. These tables each include a central depending spindle 92 that is journaled in the spindle bearings 87 and 88 and upon each of said spindles is mounted a gear 93 that meshes with and is driven by a slidable gear 94 of which there are five splined to the same number of vertical drive shafts 95 journaled in the column of the machine, and the frame of the feed works. These shafts and their slide gears, as will be seen from Fig. 6, are positioned as between the center shaft 51 and the operatable positions of the spindles of the work-carrying-tables, so as to form a positive engagement and drive from the slide gears to the larger gears 93 when the tables are in their working positions. The said large gears move from one slide gear to another with each indexing of the carrier, and simply passing out of mesh with the slide gears when so moving, whereas the slide gears in the meantime are raised by mechanism which will later be described, and again dropped into mesh with the large gears as they move forward and become positioned at their operating stations for turning the spindles and tables.

Figure 5:
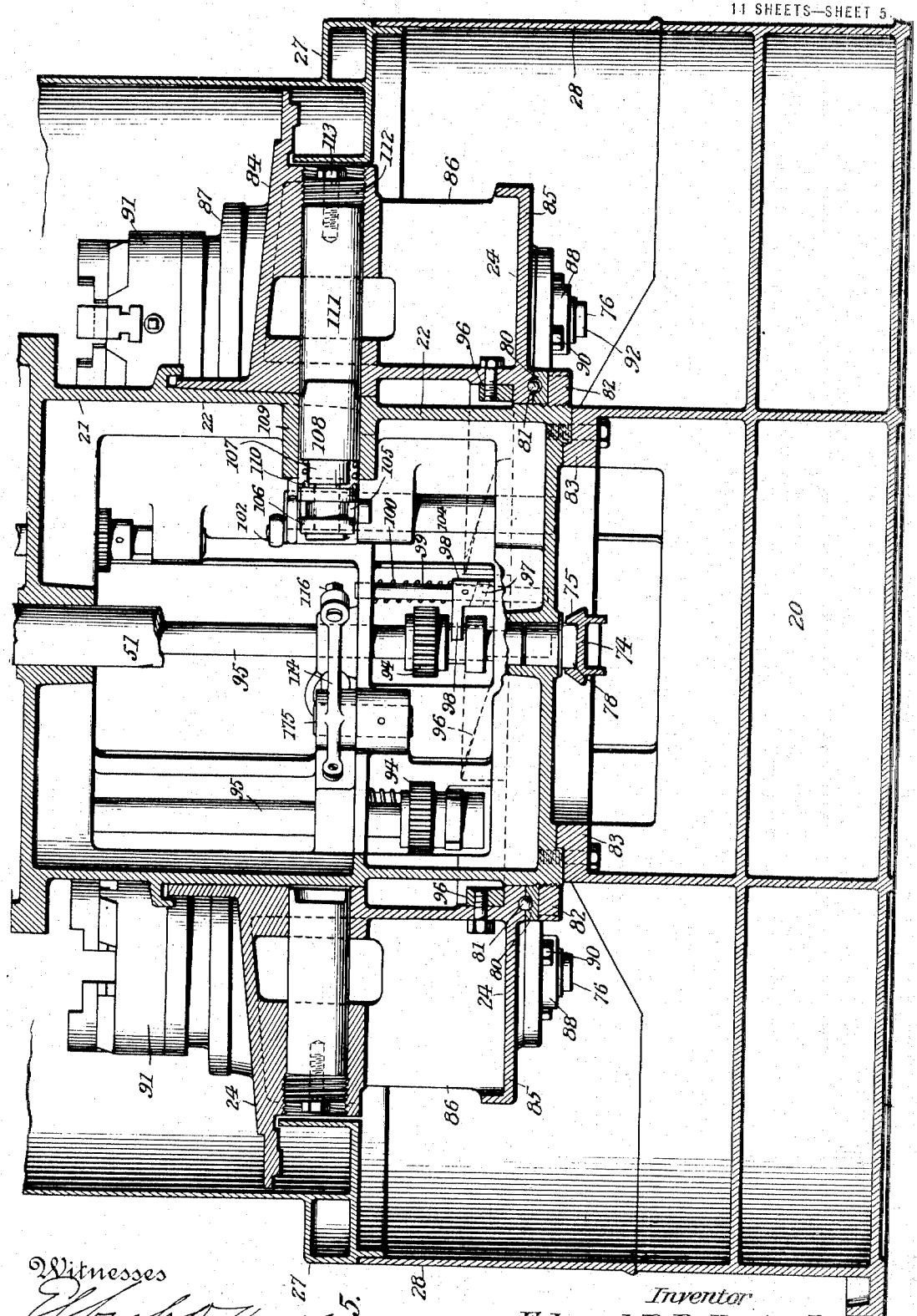
Fig. 5 shows an enlarged vertical sectional view of the base or lower portion of the machine (see Fig. 2) but taken on line 5—5 of Fig. 6.

The mechanisms for operating the slide gears are duplicates in each instance and are simultaneously operated by a series of six cams 96 mounted upon the inner annular wall of the carrier 24 (see Fig. 5). Each cam includes an inclined surface that simultaneously engages lugs 97 on the hub of the forks 98 which engages the grooves of the sliding gears 94 before mentioned. These forks are pinned to the rods 99 that are slidably mounted in bearings formed upon the inside of the column. A spring 100 which is mounted upon each of these slide rods serves to insure the dropping of the slide gears into mesh with the large gears when the same have come up into alinement.

In order to properly hold the carrier in position during the operations of the several work tables and to effect a quick release of the same when the work upon the table has been completed, I have provided mechanism which is perhaps best shown in Figs. 5 and 6 and wherein it will be seen that there is mounted upon the main shaft 51 a special shaped cam 101 against which bears a roll 102 mounted upon the outer end of a rocker arm 103 that is pivoted at 104. This arm carries upper and lower shoes 105 that slidably operate in a sliding collar 106 mounted upon the reduced end 107 of the lock pin 108, said lock pin being slidably mounted in the bearing 109 of the column. A spring 110 is interposed between the sleeve of the reduced end of the lock pin 108 and the shoulder of the same pin so as to normally tend to hold the lock pin to its seat. There is but one of these movable lock pins mounted in the column, whereas there are six stationary lock pins 111 mounted in the carrier and positioned at equal distances apart for the engagement of the said operatable lock pin when the work tables are in the operative positions. These lock pins 111 are radially mounted in the carrier and are provided with an inner tapered socketed end to be engaged by the correspondingly tapered inner side walls of the split end of the operatable lock pin 108. These stationary pins 111 are made adjustable by reason of the threaded plug 112 and the binding screw 113 carried by said plug. Thus it will be apparent that with each turn of the shaft 51 and each one-sixth turn of the carrier the cam 101 makes a complete rotation and serves to withdraw the operatable lock pin from one of the fixed lock pins and reseat it against the next fixed lock pin which is brought forward to aline therewith.

In order to insure a more accurate positioning of the carrier with each stopping of the same preparatory to the operating of the work-carrying table, I provide, in addition to the lock pin mechanism heretofore described, what I term a binding device, (see Fig. 6), which is positioned about one-third of the distance around the column to effect an engagement with the carrier simultaneous with that of the lock pin so as to positively insure the accurate positioning of the carrier with each setting of the same and to prevent any possible displacement due to the cutting pressure of the tools. This mechanism is also best illustrated in Figs. 5 and 6 and as will be noted includes a lever 114 which is pivoted at 115 to the column and is provided with an adjustable screw 116 that contacts with a lug 117 formed upon the under side of the before-mentioned cam 101. A plug 118 is slidably fitted in a radial hole formed in the face of the cylindrical portion of the column in position to engage the inner wall of the carrier and upon the arm 114 is formed an adjustable member 119 to engage the inner end of the plug 118 so that with each rotation of the cam 101 and the positioning of the same, as shown in Fig. 6, to effect the locking of the carrier to the column, the lug of the cam would be brought to register with the screw 116 of the arm 114 so as to throw the same out and in turn force the plug 118 out against the carrier, thereby causing a binding engagement at that point as well as at the point engaged by the lock pin 108.

The matter of the releasing, starting and indexing of the carrier, as well as the binding and locking of the carrier when again positioned, is controlled by a single unit situated within the upper portion of the column and mounted upon the central shaft 51 which unit in turn is released by the operation of the slides, and particularly by the last slide up, in the operation of the machine. This indexing mechanism is shown in Figs. 2, 7, 8, 9 and 10 and as will be seen comprises in part the before-mentioned indexing controller 69 which includes a series of five studs 120 formed upon the face of the drum for the engagement of a like number of bell crank arms 121 that are mounted upon short rocker shafts 122 journaled in bearings formed upon the inside of the column. Each of these bell crank arms carries a pin 123 upon one end portion, to be engaged by the studs 120 upon the face of the controller to hold the latter against rotary movement until such times as when the last one of the series of five studs has been disengaged. The smaller end 124 of the bell crank is disposed against the face of the drum and in line with the path of movement on the stud designed to engage the pin of the same bell crank arm, so that when each stud is carried around it will engage said end 124 and move it out, thereby moving the other, or long end, of the bell crank and its pin in position to again engage the pin and stop the controller when it makes its one complete rotation. Upon the upper end of each of the rocker shafts is mounted an arm 125 whose outer free end is positioned to engage a slidable operating pin 126 radially mounted in the column and designed to force the said arm in, lock its shaft and also operate the bell crank arm upon the same shaft in a way to disengage its pin from the lug upon the drum. This operating slide pin 126, and of which there are five in the machine, is provided upon its outer end with an inclined face 127 (see Fig. 10) that is engaged by a collar 128 that is also provided with an inclined face to engage the said operating pin and shove it in for the purpose before stated. The collar 128, before mentioned, is fixed upon a rod 129 that in turn is carried by the tool heads 130 that are slidably mounted upon the outer face of the column and through which rods the tool heads are moved up and down to and from the work-carrying tables by additional means which will later be more fully explained.

From the foregoing description it will be noted that when the controller unit is positioned as in operation it is held at five points, and these points of engagement are released one after another by the return or upward movement of the slides until the last slide has finished its work and returned to its uppermost position forming a complete releasement of the controller. This releasement leaves the controller free to be actuated by a spring 131 (see Figs. 7 and 8) one end of which is secured to a pin carried by the controller and the other end to an arm 132 keyed to the shaft 51. The action of this spring upon the controller unit is merely to impart to it a slight rotary movement sufficient to lock the gear 49 to shaft 51.

This locking device includes a bell crank arm 133 which is pivotally mounted upon the before-mentioned arm 132. The long end of the arm bears a pin 134 that is disposed upward and engages a socket 135 formed in a plate attached to the underside of the controller so that the before-mentioned rotary movement of the drum, imparted by the action of the spring, will tend to swing the bell crank lever upon its pivot. The short end of this bell crank lever also carries a pin 136 that engages a cross slot in a lock pin 137, said lock pin being slidably mounted in a guide way formed in the arm 132. The outer end portion of this lock pin is positioned to engage the notches 138 in the clutch face 50 of gear 49, said latter gear as before stated being secured to the shaft 51.

As before mentioned the machine includes a series of five tool carrying slides for operating in conjunction with the five work-carrying tables 91 when positioned beneath the slides. Each of these slides, as well as the work-carrying tables, are operated through a separate set of feed works of which there are five (see Figs. 3, 4, 10, 11 and 12), arranged in the upper inclosure and positioned around the large gear 60 through which they are driven. These feed works are alike in construction, as are their operative connections with the work-carrying tables and therefore a detail description of one set will be understood as applying to the others and like reference characters will be employed upon the same parts of the several sets.

These feed works not only serve to rotate the tables and to move the tool carrying heads up and down and horizontally, but also include change gears whereby the speeds of the several sets of feed works may be varied. The feed works include a frame 139 of special construction in which is mounted a vertical shaft 140 having a gear 141 secured upon its lower end that meshes with and is driven by the before-mentioned large gear 60. This vertical shaft is provided with a spiral gear 142 that meshes with a similar spiral gear 143 secured to the sleeve of the clutch member 144 mounted upon a horizontal shaft 145 that is also journaled in the frame. Upon the upper end of the vertical shaft 140 is mounted a change gear 146 that meshes with and drives a second change gear 147 mounted upon the before mentioned vertical shaft 95 that is arranged parallel with the said shaft 140. This shaft 95 is journaled in the feed works frame and extends down through the base plate 25 and the upper flange of the column is also journaled in the lower portion of the column as heretofore stated. This line of connections as will be noticed forms a direct operative drive from the gear 60 to the slidable gear 94 for rotating the work-carrying table, said line of connections being operatively complete when the work-carrying table is positioned for operation, but is automatically disconnected by the engagement of the cams 64 and 65 on controller 66 which operate the clutch member 57, at which time the slide gear is also automatically raised to allow the spindle gear 93 to move forward in position.

Upon the shaft 95 is also mounted a worm 148 that meshes with and drives a worm gear 149 mounted upon a horizontal shaft 150 journaled in the frame and having upon its outer end a change gear 151 which meshes with a second change gear 152 mounted upon clutch sleeve 153 that is journaled upon the shaft 145 before mentioned. This connection serves to complete the line of drive from the before mentioned driver shaft 140 to the said shaft 145, which latter bears a worm gear and two clutch members whereby a relatively slow or fast vertical or horizontal movement is imparted to the tool carrying slides. 154 represents a worm which is keyed to the shaft 145 and meshes with and drives the large worm gear 155 mounted upon the vertical shaft 156 journaled in the feed works frame. A drum 157 that is secured to both the worm gear 155 and the shaft 156 is provded with a cam face 158 that engages a roll 159 upon the vertical rod 129 slidably mounted in the feed works frame, base plate and column. A rack 161 (see Fig. 4) is secured to the lower end of this slide rod and engages a pinion 162 upon a short stud 163 journaled in the saddle 169 and swivel 160 of the tool head, slidably mounted in ways 164 formed in the face of the column. Upon the outer end of this short stud 163 is formed a second pinion 165 that engages a rack 166 mounted in the front slide 167 forming the outer face of the tool head. The slides as shown are supported upon the rod 129 and move down therewith in the position shown in Fig. 4 until the slide 169 strikes an adjustable stop 130ª, (see Fig. 2), and the tool is positioned, whereupon a further downward movement of the rod and its rack acts to turn the pinions 162 and 165 which move the cross rack 166 and slide 167 in which it is mounted. This tool head is supported through a counterweight rod 168 slidably mounted in the base plate 25, and the lower end of which is secured to the saddle 169 of the tool head, and the other end being connected by a cable 170 that passes over the rolls 171 secured to the under side of the top plate 30 and having its other end connected to a counterweight 172 that is hung against and guided by the rods 173 of the feed works frame. The purpose of the weight obviously being to counterbalance the weight of the tool head and to hold the roll of the slide rod up against the cam face of the cam 158 and thus impart motion to the tool heads for the operation of the tools carried thereby.

From the foregoing it will be noted that both the spiral gear 143 and the change gear 152 are mounted upon sleeves 144 and 153 respectively having clutch faces adapted to be engaged by similar clutch faces of slidable sleeves 174 and 175, respectively, and both of which are splined to the beforementioned shaft 145 carrying the worm 154. The gears 143 and 152 and this clutch faced sleeve are driven at different speeds, the first being a constant feed speed and the other a changeable speed by reason of the change gears 51 and 52 before mentioned, to suit the operating conditions. Therefore, by the engagement or disengagement of either of the clutches 174 or 175, the shaft, worm and gear may be driven at two different speeds, said movable clutch members being so connected that but one can be engaged at a time. This connection comprises a slide rod 176 which bears a forked arm 177 for the clutch member 174 and an arm 178 for the clutch member 175. This side rod is adapted to be automatically shifted longitudinally in a way to move the clutch members, by connections yet to be described.

The machine is so designed that as the respective tool slides rise to their uppermost normal position they respectively assume a position of rest which necessarily means that the shaft 156 through which they are driven must positively cease to rotate. This shaft together with its worm-gear and drum makes a complete rotation with each downward and return movement of the slide, which means that the said worm-gear is stopped at the same position with each cycle of operations. Therefore, upon this gear I have provided a dog 179 that serves to contact with a spring actuated plunger 180 slidably mounted in the feed works frame and having its forward end positioned to engage the annular groove of the slidable clutch member 174 so as to hold the same together with the connected clutch member 175 in a neutral position. In this connection it will be understood that the slide rod 176 together with its forked arms serve as a yoke to unite these two clutch members so that when one is out of engagement and in a neutral position the other is likewise positioned. The minute this slide rod and its clutches are operated, as for instance to the right as shown in Fig. 13, and the line of drive is through the clutch members 144 and 174 the dog is carried forward by its gear in a way to press forward the spring pin 180 until the dog passes by the butt end of the said pin in a way to release it and leave the clutch members free to be further slidably operated when occasion requires.

Figure 2:
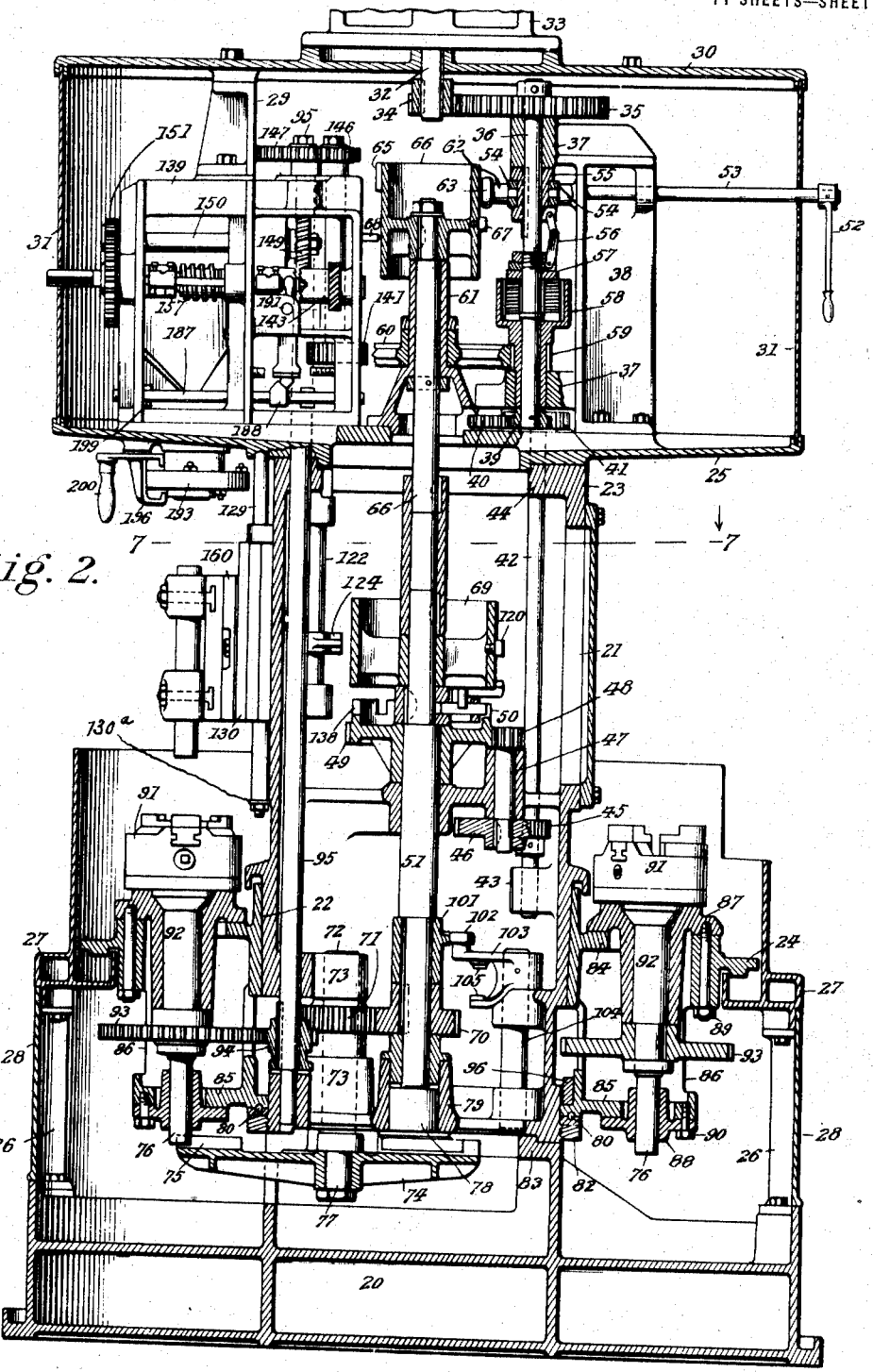
Fig. 2 shows a central vertical section through the machine shown in Fig. 1 and particularly designated on line 2—2 of Figs. 3 and 6.
Figure 3:
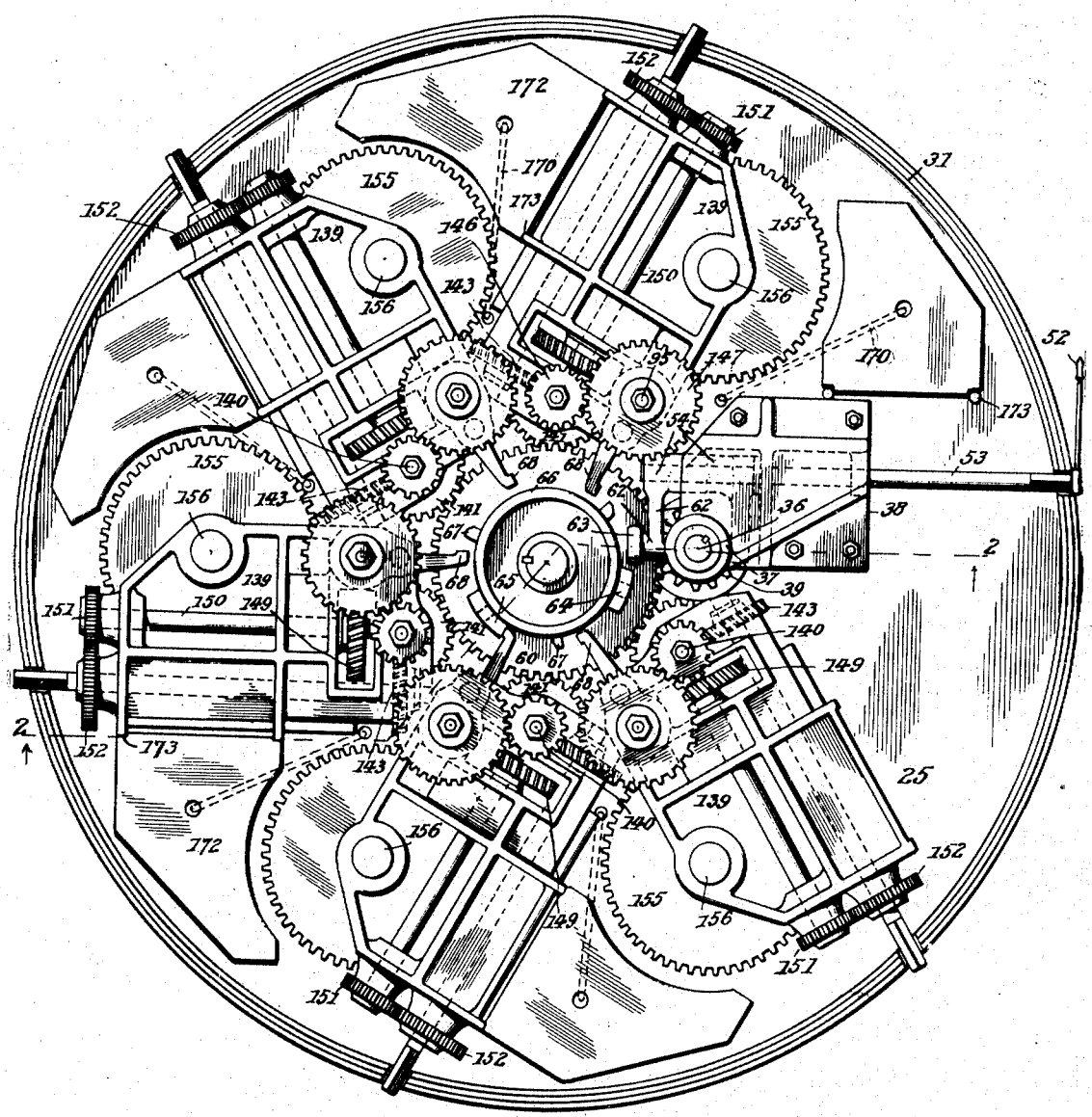
Fig. 3 shows a plan view on an enlarged scale of the upper portion of the machine, the top plate being removed, to illustrate the several sets of feed works mounted beneath.
Figure 4:
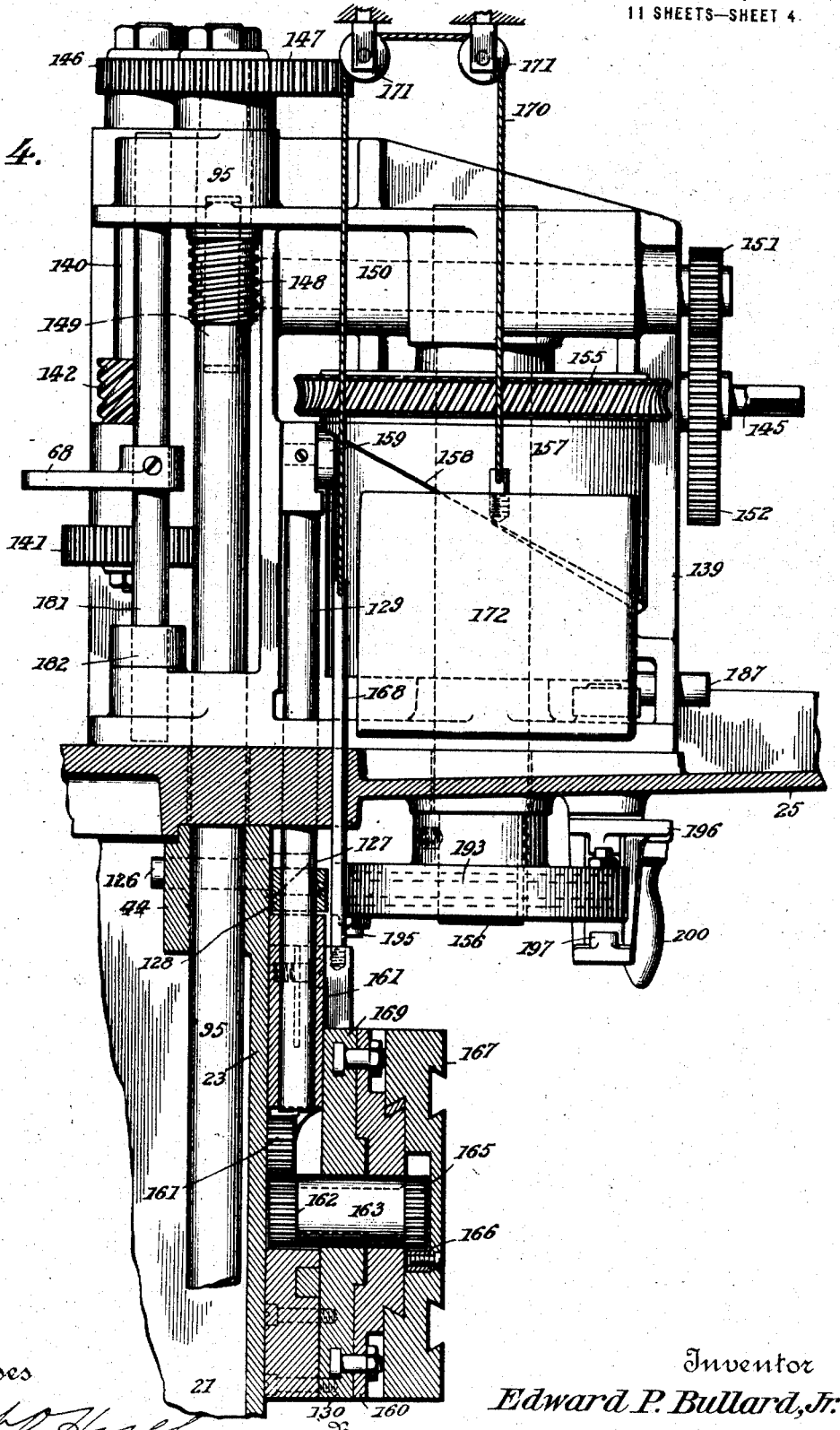
Fig. 4 shows a further enlarged sectional elevation of the set of feed works shown in Fig. 2, but, as viewed from the opposite side, the same more clearly illustrating the connections, and relation of the said feed works with the tool-carrying slides.

These clutch members are automatically operated through a line of connections with the controller 66 as will now be explained. Referring to Figs. 2 and 13 it will be seen that the controller includes a series of lugs 67, one for each set of feed works, and directly serve to engage the arm 68 upon the rocker shaft 181 journaled in the frame and upon the lower end of which is also mounted a second arm 182 that is pivotally connected to a lever 183 hung upon a stud 184 secured to the base of the feed works frame and having a forked end 185 that carries a pin 186 which passes through a slot in a slide rod 187 horizontally mounted in ways of the frame. Upon this slide rod is carried an arrow point 188 which engages a spring-actuated plunger 189 that is slidably mounted in a plunger lever 190 pivotally mounted in the frame at 191 and having a forked upper end that engages the collar 192 carried upon the end of the before-mentioned slide rod 176, so that with every rotation of the controller each one of its lugs 67 will engage one of the arms 181 and throw the clutch member 174 into engagement with the rapidly driven feed shaft 140, whereby the quick downward movement of the slide is effected preparatory to the slower and operative movement of the tool head, said sleeve and operative movements being provided through the change gears 151 and 152 upon the outer end of the shaft 145.

This clutch mechanism for shifting from the fast to the slow speeds for operating the tool head at different speeds is automatically operated through two different lines of mechanism, the one which I have already described serving to perform the initial operative engagement with the rapid drive 140 for the quick advance of the tool slide in position for operation, whereas the other mechanism which I will next describe serves to shift from the line of connections from the rapid shaft 140 to the slower driven shaft 150 and may be changed as frequently as the work requires in order to perform the same in the quickest possible time. In addition to the automatic mechanism for alternately shifting from the fast to the slow power, I provide a connection for manually operating these clutches whereby they may be further shifted at the will of the operator should occasion require. This latter mechanism for the alternate shifting of the clutches includes a disk 193 upon the cam shaft 156, which disk is provided with two annular T slots 194 in both its upper and lower faces and wherein the trip pins 195 are adjustably positioned for the engagement of a lever 196 that is pivotally hung from the under side of the base plate. This lever has inturned ends 197 which lie in the path of movement of the trip pins 195 when positioned in the side face of the disk so that the said pins will engage the ends 197 and throw the lever a distance sufficient to move the before mentioned slide rod 187 and its arrow point with which the lever 196 is connected. As many of these trip pins are employed as are required to effect a given number of operations of the clutches and may be located at any chosen position necessary to cause the shifting of the clutches at fixed points of change of speed of operations. The lever 196 is directly secured upon a rocker stud 198 (see Fig. 12) journaled in the base plate and having upon its upper end an arm 199 bearing a forked end with a pin that passes through the slot in the slide rod 187.

Upon the outer end of the before mentioned lever 196 is secured a handle 200 which is designed to be engaged by the operator for the manual manipulation of the lever, slide rod and clutches so that either of the said clutches may be engaged or disengaged to momentarily or otherwise shift from one speed to the other.

Having thus described my invention, what I claim and desire to secure by Letters Patent is:—

1. In an automatic machine tool of the class described, the combination of a base, a carrier rotatably mounted thereon, a series of spindles mounted in the carrier, a driven shaft, a crank shaft operated thereby, and an indexing arm carried by the crank shaft and adapted to engage the spindle ends to move them and the carrier forward a predetermined distance.

2. In an automatic machine tool of the class described, the combination of a base, a carrier rotatably mounted thereon, a series of spindles mounted in the carrier, a driven shaft, a pivotal guide shoe, a crank shaft, an indexing arm carried by the crank shaft and having one end in slidable engagement with the shoe and the other end adapted to engage and move the carrier a predetermined distance.

3. In an automatic machine tool of the class described, the combination of a base, a carrier rotatably mounted thereon, a series of work carrying tables mounted in the carrier and having projecting spindle ends, an operating shaft, means interposed between the operating shaft and spindle ends for alternately engaging and disengaging the latter for successively moving the carrier forward predetermined distances.

4. In an automatic machine tool of the class described, the combination of a base including a cylindrical column, a carrier rotatably mounted thereon, a series of spindles mounted in the carrier, a central driven shaft, an indexing arm having one end in operative engagement with the central shaft and the other end adapted to rotate the carrier, a locking pin mounted in the column, a binding device interposed between the column and carrier, and means for simultaneously operating the locking pin and binding device to position the carrier.

5. In a machine of the class described, the combination of a rotary carrier, rotary tables mounted therein, a series of vertically operable work table spindles mounted in the carrier, a central driving shaft, a crank shaft operated thereby, an indexing arm carried by the crank shaft and having one end in slidable alinement with the driving shaft and the other end adapted to engage the spindles to move the carrier.

6. In an automatic machine tool of the class described, the combination of a base including a cylindrical column, a carrier rotatably mounted thereon, a series of spindles mounted in the carrier, a central driven shaft, means for indexing the carrier, a series of sockets formed in the carrier, a horizontally arranged locking pin mounted in the column and a cam upon the shaft for operating the locking pin.

7. In an automatic machine tool of the class described, the combination of a base including a cylindrical column, a carrier rotatably mounted thereon, a series of spindles mounted in the carrier, a central driven shaft, means for indexing the carrier, a series of sockets formed in the carrier, a horizontally arranged locking pin mounted in the column, a binding device interposed between the column and carrier, a cam upon the central shaft for operating both the locking pin and binding device.

8. In an automatic machine tool of the class described, the combination of a base including a cylindrical column, a carrier rotatably mounted thereon, a series of spindles mounted in the carrier, means for indexing the carrier, a series of horizontally and radially arranged sockets formed in the carrier, an adjustable engagement pin positioned in each socket, a locking pin mounted in the column to engage the pins positioned in the carrier where the same are adapted to register therewith, and means for operating the locking pin.

9. In a machine of the class described, the combination of a rotary carrier, rotary tables mounted therein, tool slides to operate in conjunction with the tables, a centrally arranged shaft, a series of feed works arranged around the shaft and connected to be operated thereby, each of said feed works including a cam, and connections of the tool slide with the cam for operating the former by the latter.

10. The combination of a rotary carrier, and a series of rotary tables mounted therein, a series of feed works each including a cam, a centrally arranged shaft connected to the feed works, carrier and tables, a tool slide connected with the cam of each feed for operating upon work carried by the work tables.

11. The combination with a rotary carrier, and a series of rotary tables mounted therein, of tool slides to operate in conjunction with the tables, a centrally arranged shaft, a series of feed works connected to be operated by said shaft, and each including a cam, a tool slide adapted to be raised and lowered by the cam, and means for indexing the carrier when the last of the series of slides has been run up.

12. In a machine of the class described, the combination of a rotary carrier, rotary tables mounted therein, tool slides to operate in conjunction with the tables, a continuously driven shaft, a series of feed works connected with the shaft and each including a cam, a connection of the tool slide with the cam for operating the former by the latter, and a rotary controller unit for operating the several feed works.

13. In a machine of the class described, the combination of a rotary carrier, rotary tables mounted therein arranged to turn about vertical axes, a series of vertically operable tool slides to operate in conjunction with the tables, a central driving shaft, a series of feed works arranged above the tool slides and each including a cam, a gear upon the shaft and connected with each of the feed works, and a connection of the tool slide with the cam for operating the former by the latter.

14. In a machine of the class described, the combination of a rotary carrier, rotary tables mounted therein arranged to turn about vertical axes, a series of vertically operable tool slides to operate in conjunction with the tables, a central driving shaft, a series of feed works arranged above the tool slides, a cam included in said feed works, counterbalancing devices for the tool slides, a connection of the tool slide with the cam for feeding the slide against the action of the counterbalancing devices.

15. In a machine of the class described, the combination with a rotary carrier and rotary tables mounted thereon, of a feed works including a cam, a vertically and horizontally operable tool carrying slide adapted to move to and from the work tables, connections from the cams to the slide for feeding the latter to the table and cross-wise thereto, and a counterbalancing device for the slide to insure its return movement from the table.

16. The combination of a rotary carrier, a series of rotary tables mounted therein, a central driving shaft, a series of feed works all connected with the shaft and each including a cam, tool slides operated by the cams, and a rotary controller unit for automatically operating the several feed works.

17. In a multiple spindle machine tool of the class described, the combination with a central driving shaft, of a carrier mounted thereon, a series of feed works, work tables mounted upon the carrier, a series of tool slides, connections therefrom to the several sets of feed works for operating the same to feed the slides to and from the tables, a controller unit mounted upon the shaft, for automatically controlling the movement of the tool slides.

18. In a machine of the class described, the combination of a driving shaft, a clutch thereon, a series of feed works, means for driving the same, a controller unit arranged to directly engage the feed works to operate the same, and connections between the controller and the clutch for operating the latter.

19. In a machine of the class described, the combination of a rotary carrier, rotary tables mounted therein and arranged to turn about vertical axes, a series of vertically operable tool slides to work in conjunction with the tables, a central driving shaft, a series of feed works arranged above the tool slides, a clutch carried by each feed works for operating the same, a controller carried by the central shaft and having a separate means for operating each of said clutches.

20. The combination with a rotary carrier, and a series of rotary tables mounted therein, of tool slides to operate in conjunction with the tables, a centrally arranged shaft, a separate feed works for each tool slide, a controller mounted upon the shaft central of the several feed works, clutches included in each of the said feed works for operating same, and a series of devices carried by the controllers for operating the clutches of the respective feed works.

21. The combination of a driving shaft, a driven shaft, a clutch between the two, a controller operated from the driving shaft, connections for operating the clutch by the controller, a series of feed works arranged around the controller and adapted to be directly operated thereby, a feed slide operated by the feed works, a rotary carrier, rotary work holding tables mounted in the carriers, and means for indexing the carrier.

22. The combination of a base, a carrier rotatably mounted thereon, rotary work tables mounted in the carrier, means for indexing the carrier, mechanism for rotating the work tables, a series of tool slides to operate upon the work carried upon the work tables, feed works for operating the slides, a controller unit for operating the feed works, and a second controller unit for controlling the indexing of the carrier.

23. The combination with a rotary carrier, rotary work tables thereon, and means for operating the same, of a series of tool slides, a series of feed works including a cam for feeding the tool slides, a driving shaft, a single means for operating all the feed works, a controller upon the shaft for starting the operation of each of the feed works to feed the tool slides, and mechanism connected with the cam shaft for automatically stopping the operation of the tool slides.

24. In a machine of the class described, a feed works comprising a driving shaft, a clutch shaft connected therewith, an intermediate shaft connected to be driven from the driving shaft at a different rate of speed, two clutch members and gears loosely mounted upon the clutch shaft, one connected to the first mentioned driving shaft and the other with the driven shaft, slidable clutch sleeves keyed upon the clutch shaft to engage the before mentioned clutch members, connections for operating the two sliding clutch members simultaneously, a shaft and cam conected to be driven by the clutch shaft, and automatic trip mechanism connected with the cam shaft for shifting the slidable clutch members from one driving connection to the other.

25. The combination with a rotary carrier, rotary work tables mounted thereon, a series of tool slides, a series of feed works for feeding the slides, a driving shaft having a direct connection for operating all the feed works, a driven shaft arranged central of the carrier, and a controller mounted upon the driven shaft and central of the series of feed works for engaging the same for operation.

26. In a machine of the class described, a feed works comprising a driving shaft, a clutch shaft connected therewith, a driven shaft connected to be driven from the driving shaft at a different rate of speed, two clutch members and gear loosely mounted upon the clutch shaft, one connected to the first mentioned driving shaft and the other with the driven shaft, slidable clutch sleeves keyed upon the clutch shaft to engage the before-mentioned clutch members, connections for operating the two sliding clutch members simultaneously, a cam shaft operated through the said clutches, a cam for feeding the tool slide forward and crosswise, means connected with the cam shaft for shifting the clutches automatically and by hand to drive the cam through either of the two operating connections, and means for automatically disconnecting said driving connections.

27. The combination with a rotary carrier, rotary work tables mounted thereon, a series of tool slides, a series of feed works for feeding the slides, a driving shaft having a direct connection for operating all the feed works, a driven shaft arranged central of the carrier, and a controller mounted upon the driven shaft opposite the feed works for engaging the same for operation, and mechanism connected with the feed works for automatically stopping the operation of the feed works and slides at a predetermined time.

28. In an automatic machine tool of the class described, the combination of a base, a carrier rotatably mounted thereon, a series of rotary work tables mounted in the carrier, a central driven shaft, tool slides to operate in conjunction with the work tables, a controller mounted on the driving shaft, a series of devices for engaging the controller, means connecting each tool slide with one of these devices to release the controller when all the slides are in a raised position, and means for indexing the carrier when all said slides are in a raised position of rest.

29. In an automatic machine tool of the class described, the combination of a base, a carrier rotatably mounted thereon, a series of rotary work tables mounted in the carrier, a driven shaft, tool slides to operate in conjunction with the work tables, a controller mounted on the driving shaft, a series of bell crank levers for engaging the controller, means connecting each tool slide with one of these bell crank levers to release the controller when all the slides are in a raised position, and means for indexing the carrier when all said bell crank levers are disengaged from the controller.

30. In an automatic machine tool of the class described, the combination of a base, a carrier rotatably mounted thereon, a series of rotary work tables mounted in the carrier, a central driven shaft, tool slides to operate in conjunction with the work tables, a rocker shaft for each tool slide, a controller mounted on the driving shaft, a bell crank lever for engaging the controller, means for connecting each tool slide with one of the rocker shafts for operating the bell crank levers to release the controller, and means for indexing the carrier when all said slides are raised and the controller fully released.

31. In an automatic machine tool of the class described, the combination of a base, a carrier rotatably mounted thereon, a series of rotary work tables mounted in the carrier, a driving shaft, tool slides to operate in conjunction with the work tables, a controller mounted on the driving shaft, a series of devices for engaging the controller, means connecting each of these devices with a tool slide to release the controller when all the slides are raised, means for indexing the carrier when all said slides are in a raised position, and connections intermediate of the indexing means and the controller for operating the former when the latter is released.

32. In a multiple spindle machine tool, the combination of a base, a carrier rotatably mounted thereon, a series of rotary work tables mounted in the carrier, means for indexing the carrier, a driving shaft, tool slides to operate in conjunction with the work tables, a controller mounted on the driving shaft, a clutch mounted on the driving shaft for operating the indexing means, mechanism connecting the clutch and controller for operating the former by the latter when the controller is released, and means for operating the controller when the indexing is complete.

33. In an automatic machine tool of the class described, the combination of a base, a carrier rotatably mounted thereon, a series of rotary work tables mounted in the carrier, a central driven shaft, tool slides to operate in conjuction with the work tables, a controller mounted on the driving shaft, a series of devices for engaging the controller, means connecting a tool slide with one of these devices to release the controller when all the slides are in a raised position, and a clutch intermediate of the indexing means and the controller for operating the indexing means when the controller is released.

34. The combination of a rotary carrier, rotary work tables mounted thereon, a central operating shaft, a series of tool slides, feed works for operating the slides, two controller units mounted upon the shaft, one to operate the feed works and the other to operate the carrier.

35. The combination with an operating shaft, a rotary carrier to turn therearound rotary work tables mounted in the carrier, a series of tool slides in alinement with the tables, a series of feed works arranged around the shaft for feeding the tool slides, a single means for operating all the feed works, a controller central of the series of feed works for starting the operation of each of the feed works to feed the tool slides, and mechanism connected with the controller for automatically controlling the operation of the feed works.

36. In an automatic machine tool of the class described, the combination with a vertically movable tool slide a feed works, a driving means therefor, a cam included in said feed works for moving the slide forward and backward, a driven shaft, a controller mounted thereon, a clutch mechanism in the feed works connected to be operated by the controller to engage and disengage the drive with the cam shaft, and means also connected with the controller for automatically operating the drive to the feed works.

37. In a machine tool of the class described, the combination with a base, of a carrier rotatably mounted thereupon, a series of rotary work-carrying tables mounted in the said carrier, a driven shaft coaxial with the said carrier, an indexing arm interposed between the said work-carrying tables and the shaft, and connection between the shaft and the said arm, whereby the same is caused to successively co-act with the said tables and through the same rotate the carrier step-by-step.

38. In a machine tool of the class described, the combination with a base, of a carrier rotatably mounted thereupon, a series of work-carrying tables mounted in the said carrier and having projecting ends, a driven shaft coaxial with the said carrier, an indexing-arm interposed between the said tables and shaft and adapted to be successively engaged with and disengaged from the said ends of the said tables, and means connecting the said arm and shaft, whereby the latter is operated to successively engage with the ends of the said tables for moving the carrier a pre-determined distance after which it retires for co-action with the next successive table, and so on.

39. In an automatic machine tool of the class described, the combination with a vertical movable tool slide, of a feed works including a cam for operating the slide, a driving shaft, a controller mounted thereon, a clutch connected to be operated by the controller to engage and disengage the drive for the cam shaft, means for manually operating the said clutch to engage and disengage said drive, and an automatic mechanism mounted upon the cam shaft and connected with said clutches for automatically operating the clutch to engage and disengage the drive of the cam shaft.

40. The combination of a base, a carrier rotatably mounted thereon, mechanism for indexing the carrier, a series of work tables rotatably mounted upon the carrier, a series of tool slides for operating in conjunction with the several work tables, a feed works for each tool slide, a controller unit for automatically operating the indexing mechanism for indexing the carrier, and connections from the tool slide to the controller for releasing the same for operation.

41. The combination of a base, a carrier rotatably mounted thereon, mechanism for indexing the carrier, a series of work tables rotatably mounted upon the carrier, a series of tool slides for operating in conjunction with the several work tables, a feed works for each tool slide, a controller unit for automatically operating the indexing mechanism for indexing the carrier, a second controller for simultaneously engaging the feed works to start the operation of the tool slides, and connections from the tool slides to the controller for releasing the same for operation.

42. In a multiple spindle machine tool of the class described, the combination of a carrier, a series of feed works, work tables mounted upon the carrier, a series of tool slides, connections therefrom to the several sets of feed works for operating the slides to and from the tables, a driving shaft. a driven shaft, a clutch therebetween, a controller for automatically controlling the feed works, and connections between the controller and clutch for operating the latter.

43. In a multiple spindle machine tool of the class described, the combination of a carrier, a series of feed works, a single driving gear connecting all said feed works, work tables mounted upon the carrier, a series of tool slides, connections therefrom to the several sets of feed works for operating the slides to and from the tables, a driving shaft, a driven shaft for operating the gear, a clutch between the driving and driven shafts, a controller for automatically controlling the feed works, and connections between the controller and clutch for automatically operating the latter.

44. In an automatic machine tool of the class described, the combination with a base, of a carrier rotatably mounted thereupon, a series of rotary work-carrying tables mounted in the said carrier, a complementary series of feed-works each comprising a cam, a tool-slide operated in its feeding movement by the said cam, a driving shaft, and means controlled by the said driving-shaft for independently operating the several feed-works.

45. In an automatic machine tool of the class described, the combination with a base, of a carrier rotatably mounted thereupon, a series of work-carrying tables mounted in the said carrier, a complementary series of feed-works each including a cam, a tool-slide operated in its feeding movement by the said cam, means for moving the carrier step-by-step, whereby the work-carrying tables are successively brought under the respective tool-slide, a driving-shaft, connections between the respective feed-works and work-carrying tables for operating the latter, and means for independently operating the several feed-works from the driving-shaft.

46. In an automatic machine tool of the class described, the combination with a base, of a carrier rotatably mounted thereupon, a series of rotary work-carrying tables mounted in the said carrier, a complementary series of feed works each including a cam, a tool-slide operated in its feeding movement by the said cam, a weight for returning each tool-slide to its starting position; and means for independently operating the several feed-works, whereby they are simultaneously started in operation and automatically retired in the order of their completion of their several cutting functions.

47. In an automatic machine tool of the class described, the combination with a base, of a carrier rotatably mounted thereupon, a series of rotary work-tables mounted in the said carrier, a series of complementary feed-works each including a single cam, a series of tool slides operated in the feeding direction by the said cams, means for immediately returning each tool-slide to its starting position upon the completion of its cutting operation, and means for independently operating the several feed-works.

48. In an automatic machine tool of the class described, the combination with a base, of a carrier rotatably mounted thereupon, a series of rotary work-carrying tables mounted therein, a driving-shaft coaxial with the carrier, an indexing-arm interposed between the said carrier and shaft, and means connecting the said shaft and arm, whereby the latter is caused to successively operate to effect the positive rotation of the carrier at pre-determined equal intervals of time.

49. In an automatic machine tool of the class described, the combination with a base, of a carrier rotatably mounted thereupon, a series of work-tables mounted in the carrier, a coaxial driven shaft, an indexing-arm interposed between the carrier and the said shaft, and means connecting the shaft and arm, whereby the same has oscillating and reciprocatory movement imparted to it and whereby it positively moves the carrier at pre-determined equal intervals for a pre-determined distance.

Signed at Bridgeport, in the county of Fairfield and State of Connecticut this 17th day of October, A. D. 1917.

EDWARD P. BULLARD, Jr.

Witnesses:
W. J. LYNCH,
JOHN E. COTTER,